US011443526B2

(12) United States Patent
Ohgushi et al.

(10) Patent No.: US 11,443,526 B2
(45) Date of Patent: Sep. 13, 2022

(54) ROAD OBSTACLE DETECTION DEVICE, ROAD OBSTACLE DETECTION METHOD, AND RECORDING MEDIUM STORING A ROAD OBSTACLE DETECTION PROGRAM

(71) Applicant: TOYOTA JIDOSHA KABUSHIKI KAISHA, Toyota (JP)

(72) Inventors: Toshiaki Ohgushi, Tokyo (JP); Kenji Horiguchi, Tokyo (JP); Masao Yamanaka, Tokyo (JP)

(73) Assignee: TOYOTA JIDOSHA KABSHIKI KAISHA, Toyota (JP)

( * ) Notice: Subject to any disclaimer, the term of this patent is extended or adjusted under 35 U.S.C. 154(b) by 114 days.

(21) Appl. No.: 17/002,995

(22) Filed: Aug. 26, 2020

(65) Prior Publication Data

US 2021/0110174 A1 Apr. 15, 2021

(30) Foreign Application Priority Data

Oct. 10, 2019 (JP) .............................. JP2019-187022

(51) Int. Cl.
*G06V 20/58* (2022.01)
*G01V 8/10* (2006.01)
*G06T 7/11* (2017.01)
*G06V 10/20* (2022.01)
(Continued)

(52) U.S. Cl.
CPC ............... *G06V 20/58* (2022.01); *G01V 8/10* (2013.01); *G06T 7/11* (2017.01); *G06V 10/255* (2022.01); *G06V 10/462* (2022.01); *G06V 30/274* (2022.01)

(58) Field of Classification Search
CPC .... G06V 20/58; G06V 10/462; G06V 30/274; G06V 10/255; G01V 8/10; G06T 7/11
See application file for complete search history.

(56) References Cited

U.S. PATENT DOCUMENTS

| 9,122,948 | B1* | 9/2015 | Zhu | ........................... G06T 7/20 |
| 2016/0267331 | A1* | 9/2016 | Pillai | ...................... G06V 20/56 |
| 2018/0129912 | A1* | 5/2018 | Vernaza | ............... G06N 3/0454 |

(Continued)

FOREIGN PATENT DOCUMENTS

| JP | 2007-328630 A | 12/2007 |
| JP | 2018-194912 A | 12/2018 |
| JP | 2019-008796 A | 1/2019 |

OTHER PUBLICATIONS

Son, "Road detection using segmentation by weighted aggregation based on visual information and posteriori probability of road regions", 2008 IEEE International Conference on Systems, Man and Cybernetics. (Year: 2008).*

*Primary Examiner* — Kenny A Cese
(74) *Attorney, Agent, or Firm* — Sughrue Mion, PLLC

(57) ABSTRACT

A road obstacle detection device which uses a pre-learned first identifier to associate a semantic label with each pixel of an image, uses a pre-learned second identifier to estimate a statistical distribution of a semantic label of a predetermined region of interest of the image from a statistical distribution of a semantic label of a peripheral region that surrounds the region of interest, and uses the statistical distribution of the semantic label associated with the region of interest and the statistical distribution of the semantic label estimated for the region of interest to estimate a likelihood that an object is a road obstacle.

9 Claims, 10 Drawing Sheets

(51) Int. Cl.
*G06V 10/46* (2022.01)
*G06V 30/262* (2022.01)

(56) References Cited

U.S. PATENT DOCUMENTS

| | | |
|---|---|---|
| 2018/0330615 A1 | 11/2018 | Yamanaka et al. |
| 2018/0373263 A1 | 12/2018 | Gray |
| 2020/0272854 A1* | 8/2020 | Caesar .................. G06V 20/20 |
| 2020/0285910 A1* | 9/2020 | Steelberg ............. G06K 9/6227 |

* cited by examiner

ROAD OBSTACLE DETECTION DEVICE, ROAD OBSTACLE DETECTION METHOD, AND RECORDING MEDIUM STORING A ROAD OBSTACLE DETECTION PROGRAM

CROSS-REFERENCE TO RELATED APPLICATION

This application is based on and claims priority under 35 USC 119 from Japanese Patent Application No. 2019-187022 filed on Oct. 10, 2019, the disclosure of which is incorporated by reference herein.

BACKGROUND

Technical Field

The present disclosure relates to a road obstacle detection device, a road obstacle detection method, and a recording medium recording a road obstacle detection program.

Background Art

Japanese Patent Application Laid-Open No. 2018-194912 discloses that an image is assigned a semantic label, the image is divided into local regions, and the likelihood of an obstacle is calculated from the probability of the semantic labels of the local region.

In detail, an obstacle detection device is proposed which includes a local region dividing unit that divides an input image into a plurality of local regions, and a likelihood calculating unit that calculates a probability that a road obstacle exists in the target local region based on a probability that the target local region is not a predetermined normal object and a visual saliency defined by a relationship between a surrounding local region and a target local region. Here, the visual saliency is calculated to be higher as the probability that the peripheral local region is a road is higher, and to be larger as the difference between the visual characteristics of the target local region and the peripheral local region is larger.

However, according to the technology disclosed in Japanese Patent Application Laid-Open No. 2018-194912, considering a case of failure to assign a semantic label due to a semantic label also being assigned to an object as an obstacle or the like, there is room for improvement in order to improve detection accuracy of a road obstacle.

SUMMARY

One aspect of the present disclosure is a road obstacle detection device, including: a memory; and a processor coupled to the memory, wherein the processor is configured to: use a pre-learned first identifier to associate a semantic label with each pixel of an image; use a pre-learned second identifier to estimate a statistical distribution of a semantic label of a predetermined region of interest of the image from a statistical distribution of a semantic label of a peripheral region that surrounds the region of interest; and use the statistical distribution of the semantic label associated with the region of interest and the statistical distribution of the semantic label estimated for the region of interest to estimate a likelihood that an object is a road obstacle.

DETAILED DESCRIPTION

Figure 1:
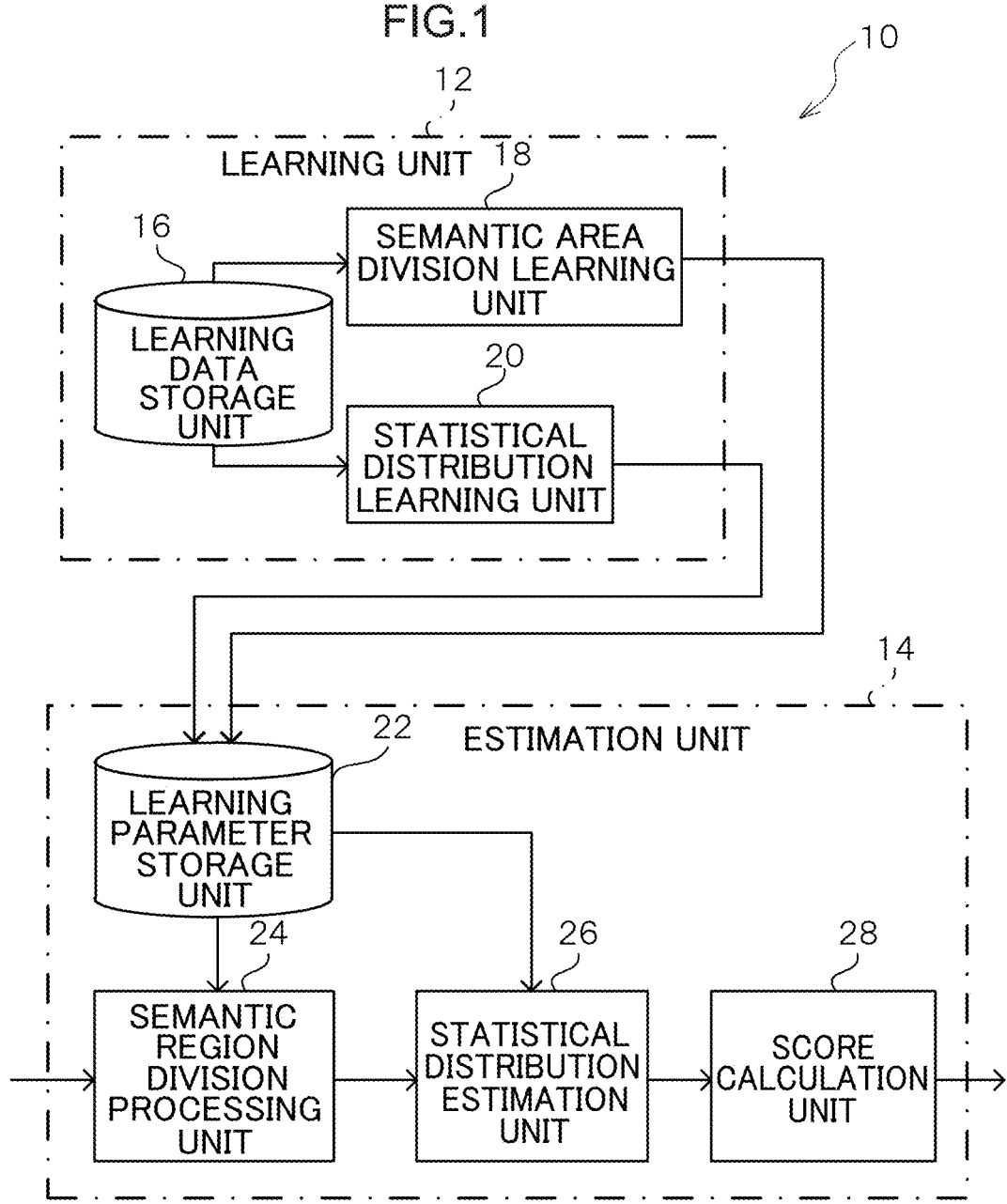
FIG. 1 is a block diagram illustrating a schematic configuration of a road obstacle detection device according to an embodiment.

Hereinafter, an example of an embodiment of the present disclosure is described in detail with reference to the drawings. FIG. 1 is a block diagram illustrating a schematic configuration of a road obstacle detection device according to an embodiment.

The road obstacle detection device 10 according to the present embodiment is configured by a computer including a CPU, a ROM, a RAM, and the like, which are examples of a processor, and has functions of a learning unit 12 and an estimation unit 14. The functions of the learning unit 12 and the estimation unit 14 may have different computer configurations. The processor may be, for example, a GPU, or a plurality of CPUs or GPUs may be used. CPU stands for Central Processing Unit, ROM stands for Read Only Memory, and RAM stands for Random Access Memory.

The learning unit 12 uses learning data prepared in advance to learn two classifiers, a first classifier for dividing an image into semantic regions, and a second classifier for estimating a semantic label in the attention region from the surrounding region.

Specifically, the learning unit 12 includes a learning data storage unit 16, a semantic area division learning unit 18, and a statistical distribution learning unit 20.

Figure 2:
FIG. 2 is a diagram illustrating an example of an RGB color image.
Figure 3:
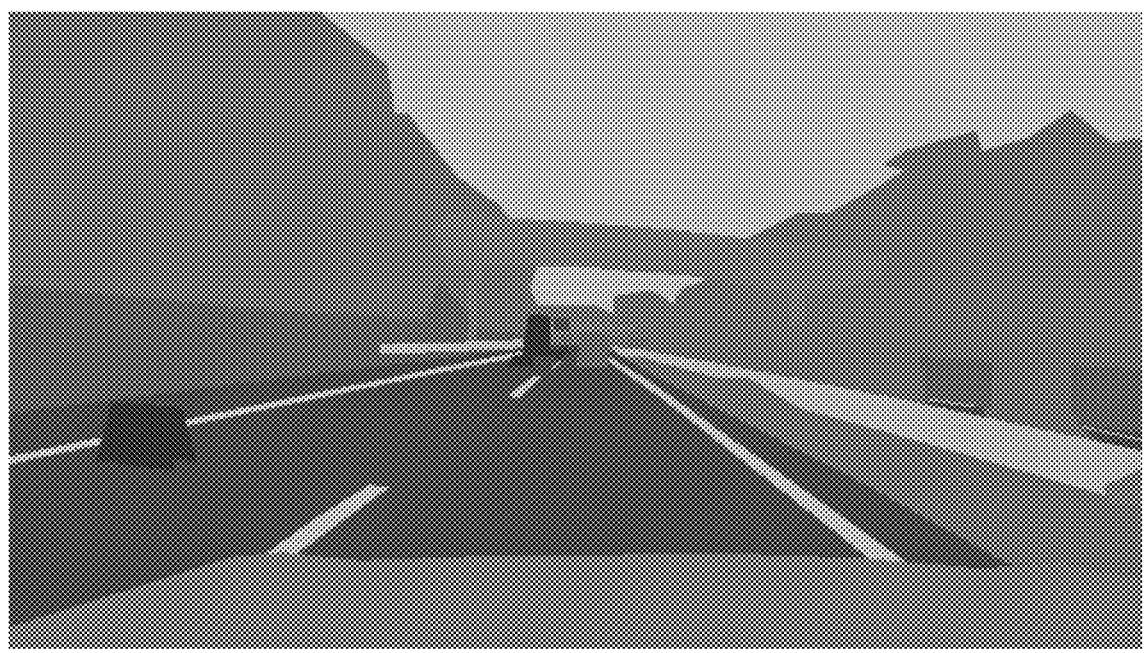
FIG. 3 is a diagram illustrating an example of a semantic label image.

The learning data storage unit 16 stores, as learning data, a large number of pairs of an RGB color image obtained by photographing with a photographing device such as a vehicle-mounted camera and a semantic label image in which a semantic label is assigned to each pixel in the image. The semantic label may be, for example, sky, road, white line, vehicle, and the like, but is not limited to these. For example, an RGB color image shown in FIG. 2 and a semantic label image shown in FIG. 3 are stored in the learning data storage unit 16 as learning data. FIG. 2 is a diagram showing an example of an RGB color image, which is represented in gray tone, and FIG. 3 is a diagram showing an example of a semantic label image represented by a different gray level for each label.

The semantic area division learning unit 18 uses the learning data stored in the learning data storage unit 16 to input an RGB color image and learn a first classifier that estimates a semantic label for each pixel in the image.

Figure 4:
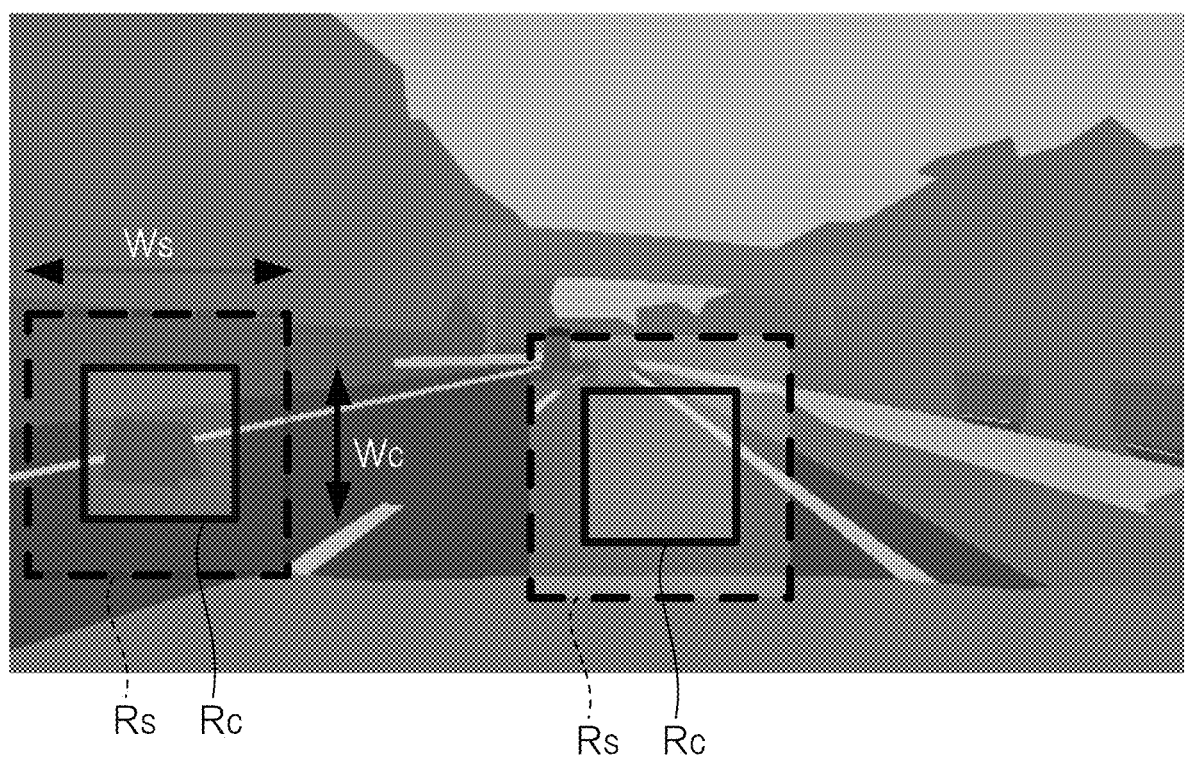
FIG. 4 is a diagram illustrating an example of an attention area and a peripheral area in a semantic label image.

The statistical distribution learning unit 20 uses the learning data stored in the learning data storage unit 16 to input a semantic label image in a peripheral region Rs around the predetermined region of interest Rc in the image, and learn a second classifier that estimates the statistical distribution for the semantic label in the region of interest. At this time, when learning the second classifier, learning is performed so that the likelihood of a road obstacle is minimized. The attention area Rc is a square area indicated by a solid line in FIG. 4, the peripheral area Rs is a square area indicated by a dotted line outside the solid line in FIG. 4, and, in place of the semantic label image, the probability density for the target label for each pixel may be used.

In addition, these discriminators can learn using a technique such as FCN, RNN, CNN, CRF, and CRFasRNN. Further, the sizes Wc and Ws of the attention area Rc and the peripheral area Rs may be determined by trial and error. Alternatively, it may be determined using Bayesian optimization or the like. FCN represents Fully Convolutional Network, RNN represents Recurrent Neural Network, CNN represents Convolutional Neural Network, CRF represents Conditional random field, and CRFasRNN represents Conditional Random Fields as Recurrent Neural Networks.

On the other hand, the estimation unit 14 calculates the likelihood of a road obstacle at all points in the image using the two classifiers obtained at the learning unit 12, and based on the calculated likelihood of the road obstacle, a road obstacle is detected. The two classifiers may be a first classifier and a second classifier.

Specifically, the estimation unit 14 includes a learning parameter storage unit 22, a semantic region division processing unit 24 as an example of an assignment unit, a statistical distribution estimation unit 26 as an example of a distribution estimation unit, and a score calculation unit as an example of an obstacle estimation unit.

The learning parameter storage unit 22 stores learning parameters obtained by learning the classifier at the learning unit 12. The two classifiers may be a first classifier and a second classifier.

The semantic region division processing unit 24 estimates a semantic label for each pixel of the evaluation target image using the learned parameters for semantic region division input from the learning parameter storage unit 22, and converts into a semantic label image by providing a semantic label.

The statistical distribution estimation unit 26 uses the learned parameters for the statistical distribution estimation input from the learning parameter storage unit 22 to input the semantic label image obtained at the semantic region division processing unit 24, and estimates the statistical distribution of the semantic labels in the attention area Rc from the statistical distribution of the semantic labels in the surrounding area Rs. Instead of the semantic label image, the probability density for the semantic label may be input.

The score calculation unit 28 calculates the statistical distribution of the semantic labels in the attention area Rc using the semantic label images obtained at the semantic region division processing unit 24. Further, based on the statistical distribution of the semantic labels in the attention area Rc obtained by the statistical distribution estimation unit 26, a score representing the likelihood of a road obstacle is calculated. Then, the score calculation unit 28 detects an obstacle on the road based on the calculated score. For example, a road obstacle is detected by comparing a predetermined threshold value with a calculated score to determine whether or not there is a road obstacle.

When estimating the statistical distribution of semantic labels, the statistical distribution of semantic labels is estimated while moving the attention area Rc so as to cover the entire image.

Subsequently, a process performed by the road obstacle detection device 10 according to the present embodiment configured as described above will be described in detail.

Figure 5:
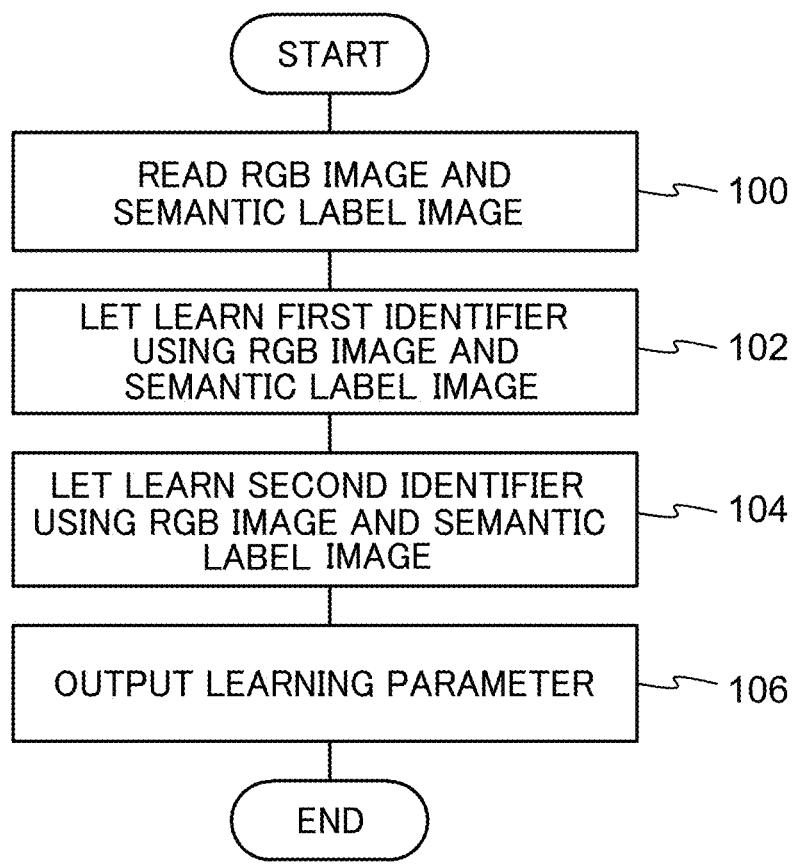
FIG. 5 is a flowchart illustrating an example of a flow of a process performed at a learning unit of the road obstacle detection device according to the embodiment.

First, processing performed at the learning unit 12 side will be described. FIG. 5 is a flowchart illustrating an example of a flow of a process performed by a learning unit of the road obstacle detection device 10 according to the present embodiment.

In step 100, each of the semantic area division learning unit 18 and the statistical distribution learning unit 20 reads the RGB color image and the semantic label image stored in the learning data storage unit 16, and the process proceeds to step 102.

In step 102, the semantic area division learning unit 18 learns the first classifier using the RGB color image and the semantic label image, and the process proceeds to step 104. That is, using the various methods described above, an RGB color image is input, and a first classifier that estimates a semantic label for each pixel in the image is learned.

In step 104, the statistical distribution learning unit 20 learns the second classifier using the RGB color image and the semantic label image, and the process proceeds to step 106. That is, a semantic label image in a peripheral region Rs around the predetermined region of interest Rc in the image is input, and a second classifier that estimates a statistical distribution of the semantic labels in the region of interest is learned. Instead of the semantic label image, the probability density for the semantic label for each pixel may be input.

In step 106, each of the semantic area division learning unit 18 and the statistical distribution learning unit 20 outputs the learning parameters obtained by the learning to the estimation unit 14, and ends a series of processing. As a result, in the estimation unit 14, the learning parameters are stored in the learning parameter storage unit 22.

Figure 6:
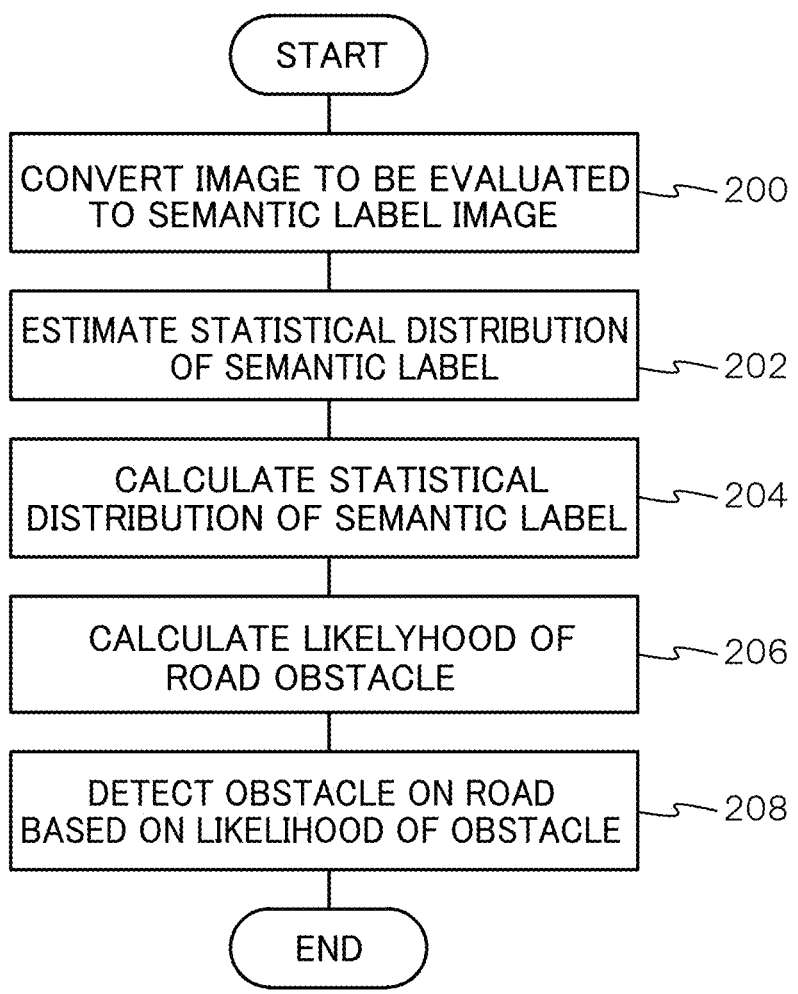
FIG. 6 is a flowchart illustrating an example of a flow of a process performed at an estimating unit of the road obstacle detection device according to the embodiment.

Next, processing performed at the estimation unit 14 side will be described. FIG. 6 is a flowchart illustrating an example of a flow of a process performed at an estimation unit 14 of the road obstacle detection device 10 according to the present embodiment.

In step 200, the semantic region division processing unit 24 converts the image to be evaluated into a semantic label image using the learning parameters stored in the learning parameter storage unit 22, and the process proceeds to step 202. More specifically, the evaluation target image is converted into a semantic label image by estimating a semantic label for each pixel using the learned first classifier with the entire evaluation target image as an input.

In step 202, the statistical distribution estimation unit 26 uses the learning parameters stored in the learning parameter storage unit 22 to estimate the statistical distribution of the semantic labels in the attention area Rc from the statistical distribution of the semantic labels in the surrounding area Rs, and the process proceeds to step 204. In detail, focusing on a certain point in the image, using the learned second classifier, the statistical distribution Ds (for example, road 60%, vehicle 10%, etc.), of the semantic label in the region of interest Rc is estimated from the peripheral region Rs of a certain point that is focused on.

In step 204, the score calculation unit 28 calculates the statistical distribution of the semantic labels in the attention area Rc using the semantic label images obtained by the semantic region division processing unit 24, and the process proceeds to step 206. More specifically, focusing on a certain point in the image, the statistical distribution Dc of the semantic labels in the attention area Rc is calculated. The statistical distribution Dc of the semantic labels is, for example, road 50%, vehicle 30%, and the like.

Figure 7:
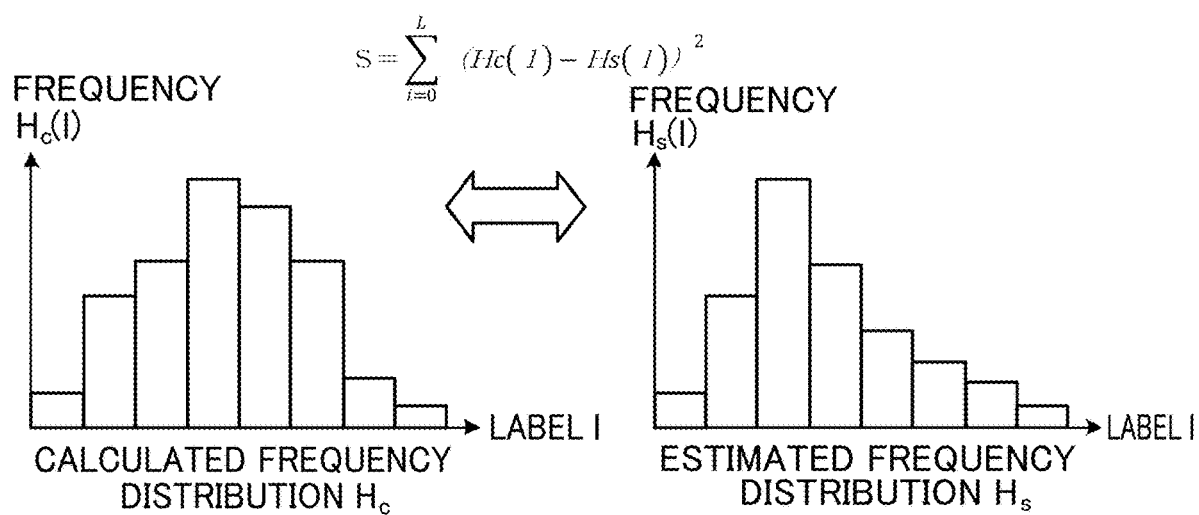
FIG. 7 is a diagram illustrating an example of a method of calculating the likelihood of an obstacle.

In step 206, the score calculation unit 28 calculates the likelihood of a road obstacle based on the statistical distribution of the semantic labels in the attention area Rc estimated by the statistical distribution estimation unit 26 and the statistical distribution of the semantic labels in the attention area Rc calculated by the score calculation unit 28, and the process proceeds to step 208. For example, the difference between the statistical distributions Dc and Ds is calculated as the likelihood of a road obstacle. The difference between the statistical distributions Dc and Ds is calculated as, for example, the difference between the frequency distribution Hc and the frequency distribution Hs. For example, the likelihood of an obstacle S can be defined by an equation using the square of the difference between the frequency distributions, with each of Hc(l) and Hs(l) as frequency distributions with respect to a first semantic label, as shown in FIG. 7, and it is possible to calculate the likelihood of an obstacle S as a score.

$$S = \sum_{l=0}^{L} (H_C(l) - H_S(l))^2$$

In step 208, the score calculation unit 28 detects an obstacle on the road based on the calculated likelihood of the obstacle, and ends a series of processing. For example, by comparing the score of the obstacle likeness S calculated by the score calculation unit 28 with a predetermined threshold value, it is determined whether or not the obstacle is a road obstacle, and the road obstacle is detected.

By performing processing in this manner, the road obstacle detection device 10 according to the present embodiment can detect a road obstacle without preparing and learning various types of obstacles themselves as learning data.

Also, since it is not necessary to prepare and learn road obstacles as learning data, the assignment of incorrect semantic labels is suppressed, and the detection accuracy of road obstacles can be improved to higher than when road obstacles are detected from semantic labels.

Further, in the present embodiment, although it is not necessary to prepare and learn obstacles as learning data, as far as learning is possible, some representative obstacles are prepared and learned as learning data such that it is possible to further improve the detection accuracy of road obstacles.

Figure 8:
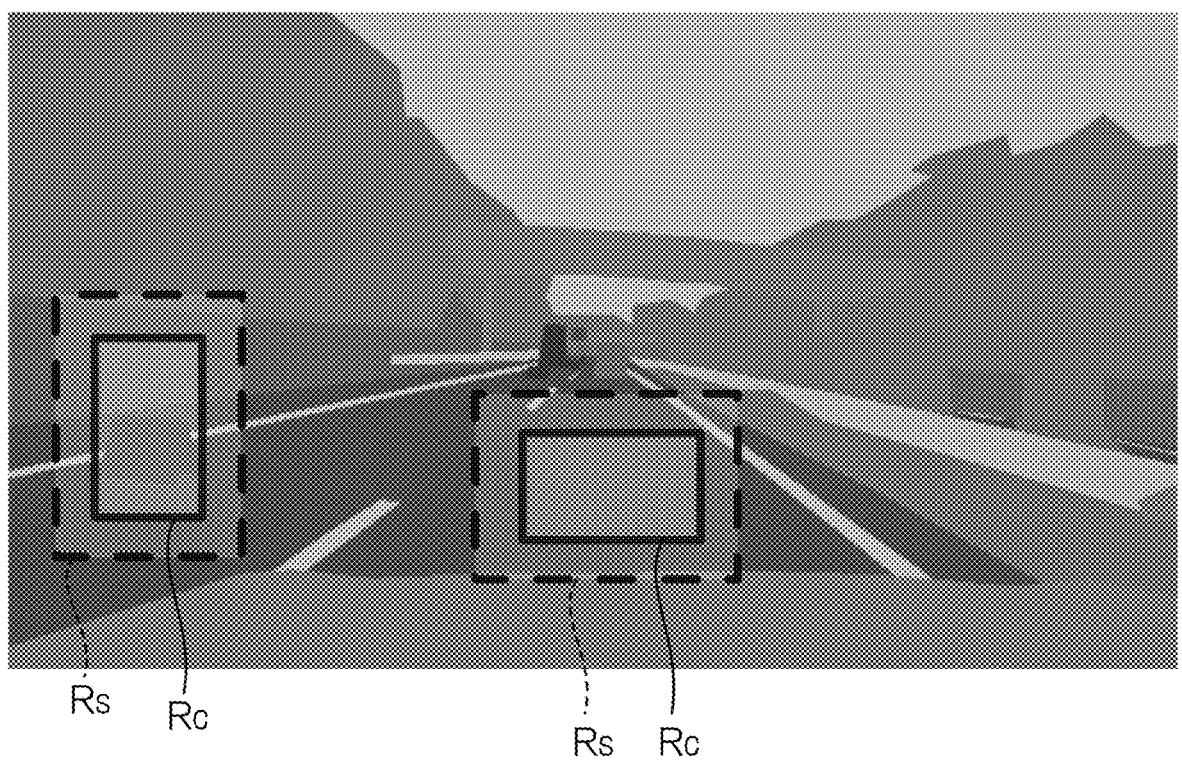
FIG. 8 is a diagram illustrating an example in which a rectangle is used as the shape of a region of interest.

In the above embodiment, the attention area Rc has been described as a square, but the shape of the attention area Rc is not limited to this. For example, as shown in FIG. 8, a shape such as a rectangle may be applied. Alternatively, other shapes such as a circle, an ellipse, and a polygon may be applied.

Figure 9:
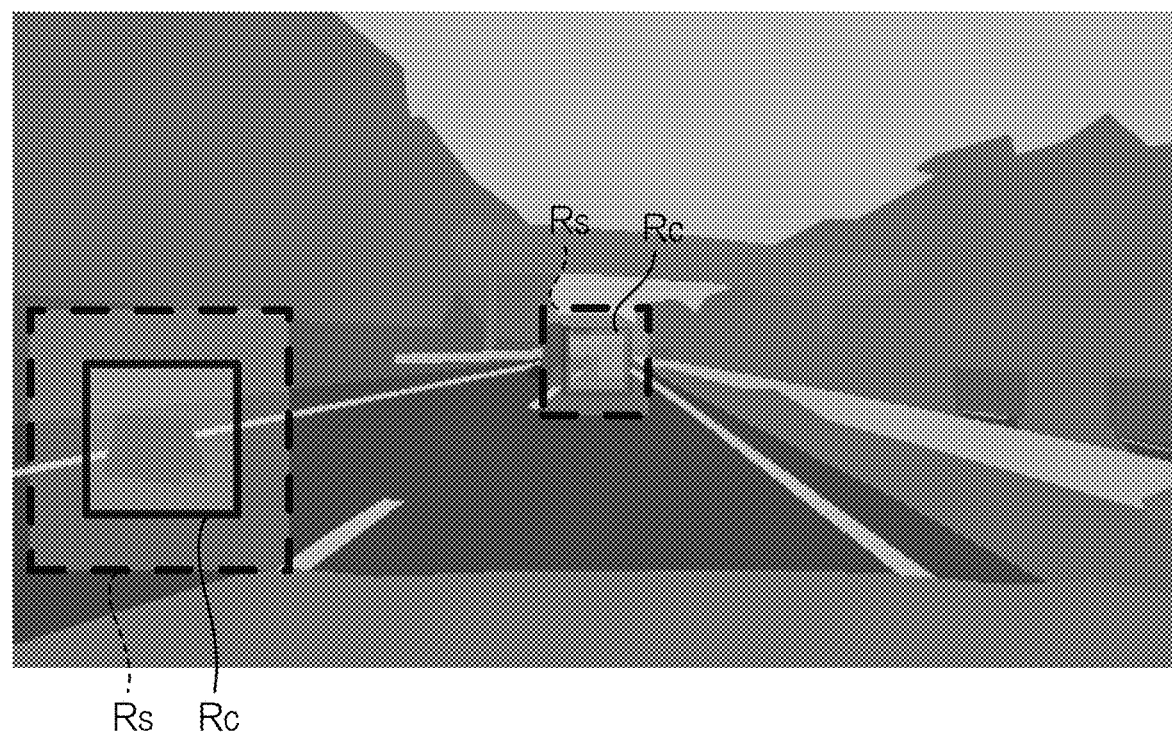
FIG. 9 is a diagram illustrating an example in which the size of each of an attention area and a peripheral area is small in a distant place and large in a near place.

Further, in the above embodiment, the size We of the region of interest Rc and the size Ws of the peripheral region Rs are determined by trial and error, and as shown in FIG. 9, may be small in a distant place and large in a near place. At this time, the determination of a distant place and a near place is determined based on, for example, the width of the road in the semantic label image, and the size of the area is determined to be smaller as the width of the road becomes narrower. The width of the road in the semantic label image is, for example, narrow in a distant place and wide in a near place.

Figure 10:
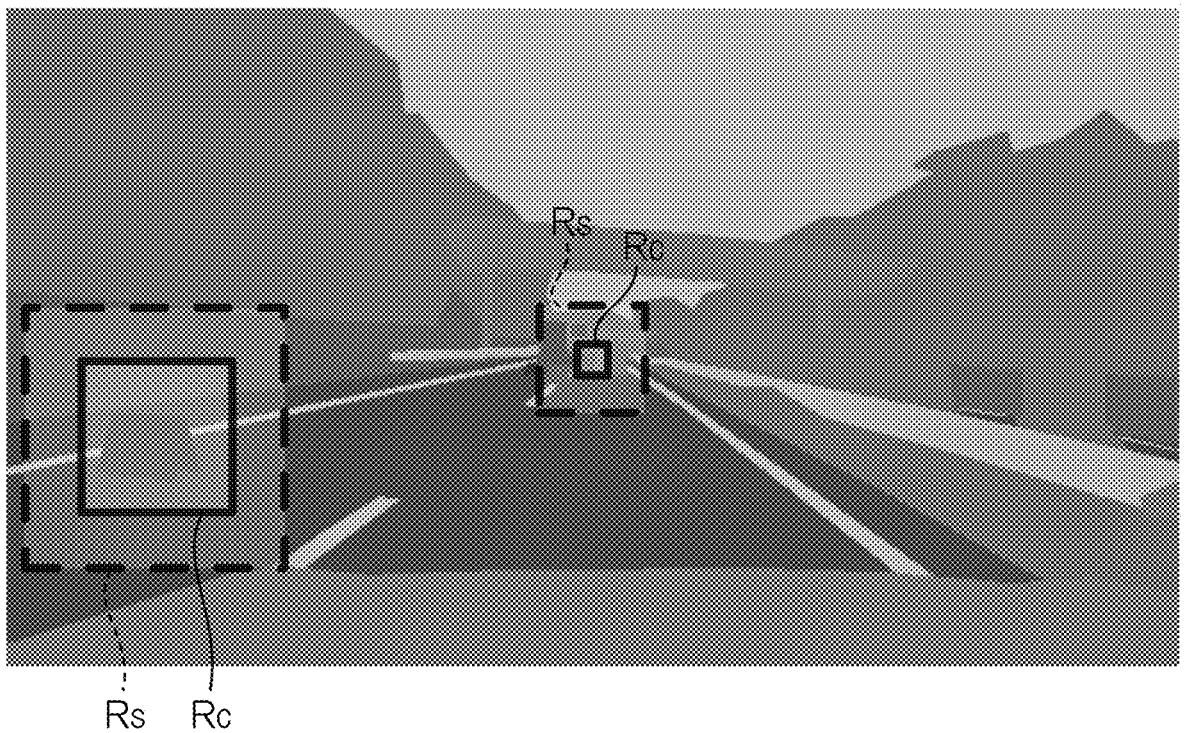
FIG. 10 is a diagram showing an example in which the ratio of the size of the peripheral region to the region of interest is large in a distant place and small in a nearby place.

Further, in the above embodiment, the ratio of the size of the peripheral region Rs to the region of interest Rc may be determined by trial and error, and may be different between a distant region and a nearby region. For example, as shown in FIG. 10, the distant place may be large and the near place may be small. That is, the ratio of the size of the peripheral region Rs to the region of interest Rc may increase as the distance increases.

Figure 11:
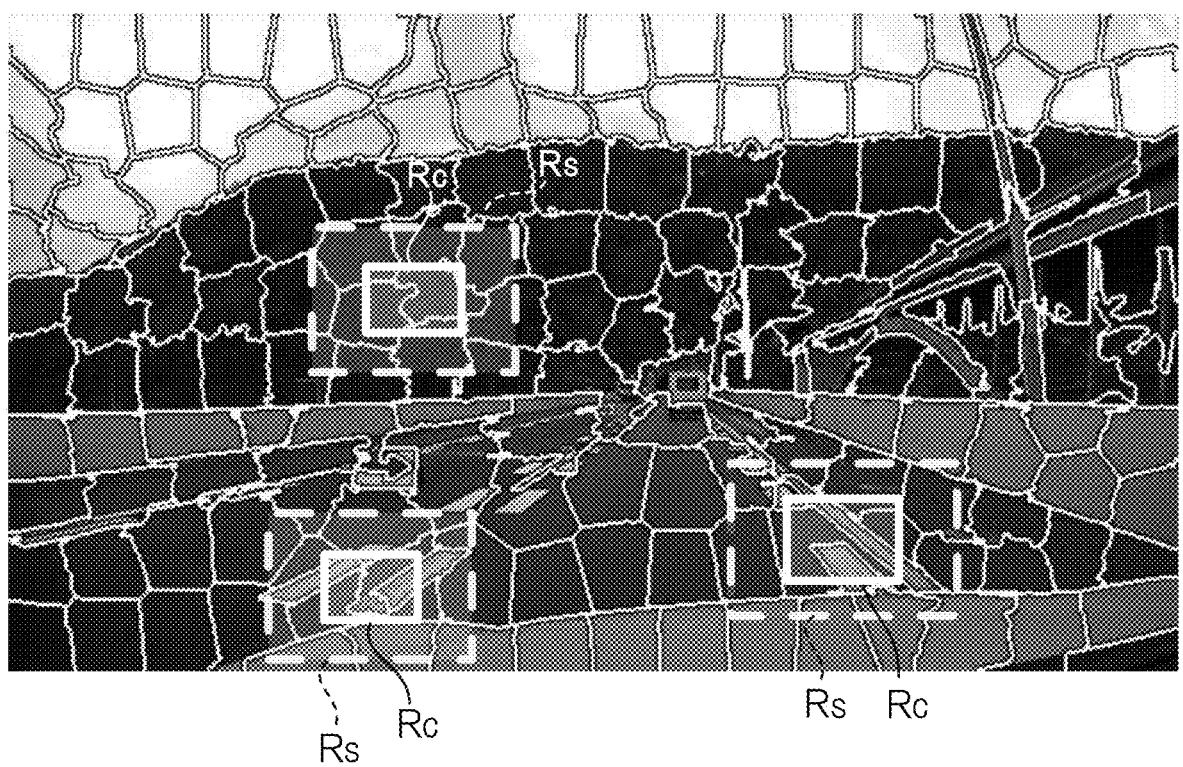
FIG. 11 is a diagram illustrating an example in which a rectangular region of a region of interest is set to include superpixels.

Further, in the above embodiment, the size of the attention area Rc and the peripheral area Rs may be set to a rectangular area of the attention area Rc so as to include a superpixels as shown in FIG. 11. Alternatively, the likelihood of an obstacle may be calculated by changing the granularity of the superpixels, and the final likelihood of an obstacle may be determined by integrating the likelihood of the obstacle calculated with each granularity. In this way, by changing the particle size, road obstacles of various sizes from large obstacles to small obstacles can be detected.

Figure 12:
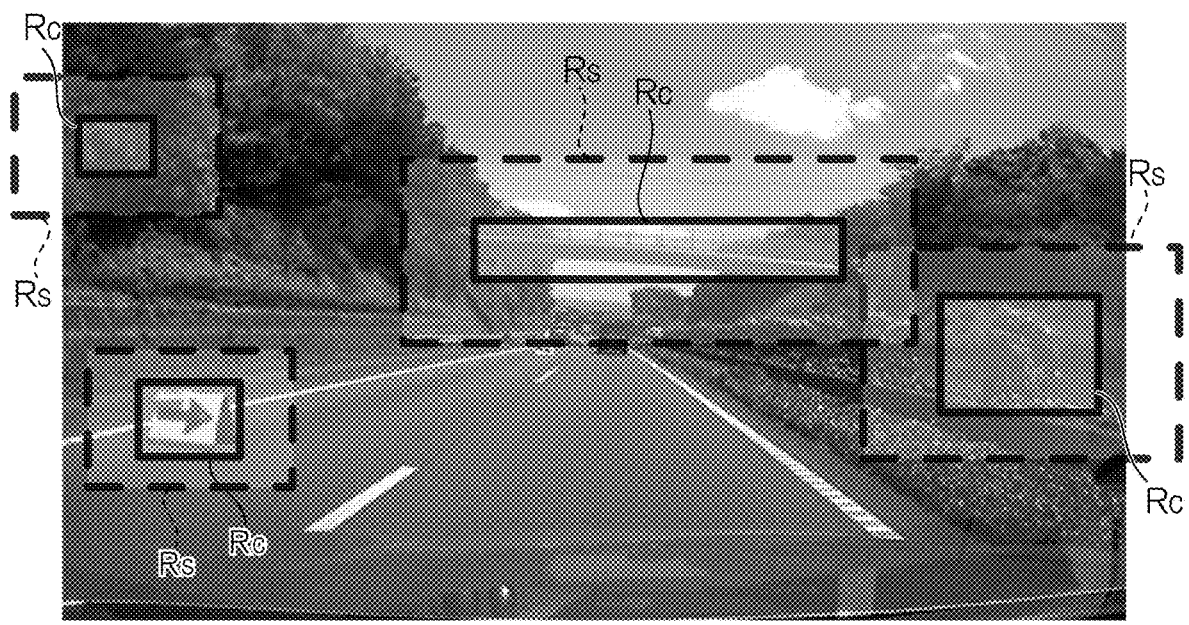
FIG. 12 is a diagram showing an example in which a rectangular area is set so as to include an object-like area using Selective Search.

Further, in the above embodiment, the shape and size of the region of interest Rc and the peripheral region Rs may be set according to the region that is likely to be an object. For example, as shown in FIG. 12, an area may be set so as to include an object-like area by using an algorithm for selecting a block area by grouping similar areas for each pixel. An algorithm for selecting a lump area is, for example, Selective Search. At the time of learning, a rectangular area may be set at random. By setting the rectangular area in this way, it is possible to reduce the processing load by limiting the area for calculating the likelihood of an obstacle.

In the above-described embodiment, although the process of detecting a road obstacle is performed on the entire image, the present invention is not limited to this, and the processing load may be reduced by limiting the detection area. For example, a vanishing point or the like may be detected from an image, and an area below a horizontal line including the vanishing point may be set as a road obstacle detection target area. Alternatively, a predetermined lower region of the image may be set as a detection target region of a road obstacle.

In the above-described embodiment, although an example in which the likelihood of an obstacle S is defined by an equation using the square of the difference between frequency distributions has been described, the present invention is not limited to this. For example, instead of a difference between frequency distributions, an absolute value of the difference, an inner product, or divergence may be applied. Here, the divergence indicates the distance between the probability distributions, but may not strictly satisfy the axiom of distance. Specifically, the definition of distance suitable for machine learning is applied. For example, a Kullback-Leibler (KL) distance, a relative Pearson (rPE) distance, or the like may be applied. Alternatively, the density difference $L^2$ Distance or the like may be applied.

The Kullback-Leibler distance is defined by the following equation using the ratio of probability densities (p (x)/p'(x)).

$$KL(p \| P') = \int p(x) \log \frac{p(x)}{p'(x)} dx \qquad \text{(Equation 1)}$$

The relative Pearson distance is defined by the following equation using the ratio of probability densities (p (x)/p'(x)).

$$rPE(p \| p') = \int q_\alpha(x) \left( \frac{p(x)}{p'(x)} - 1 \right)^2 dx \qquad \text{(Equation 2)}$$

$$q_\alpha(x) = \alpha p(x) + (1 - \alpha) p'(x) \quad 0 \le \alpha < 1$$

Also, $L^2$ distance is defined by the following equation. Note that $L^2$ Distance is a pure distance measure, not divergence, because it satisfies the distance axiom.

$$L^2(p,p') = \int (p(x) - p'(x))^2 dx \qquad \text{(Equation 3)}$$

Alternatively, the likelihood of an obstacle may be defined using a technique based on the visual saliency, which is the difference between central vision and peripheral vision. Here, a method based on the visual saliency will be briefly described. For the details of the visual saliency, the technology described in Japanese Patent Application Laid-Open (JP-A) 2018-194912 is applied.

Figure 13:
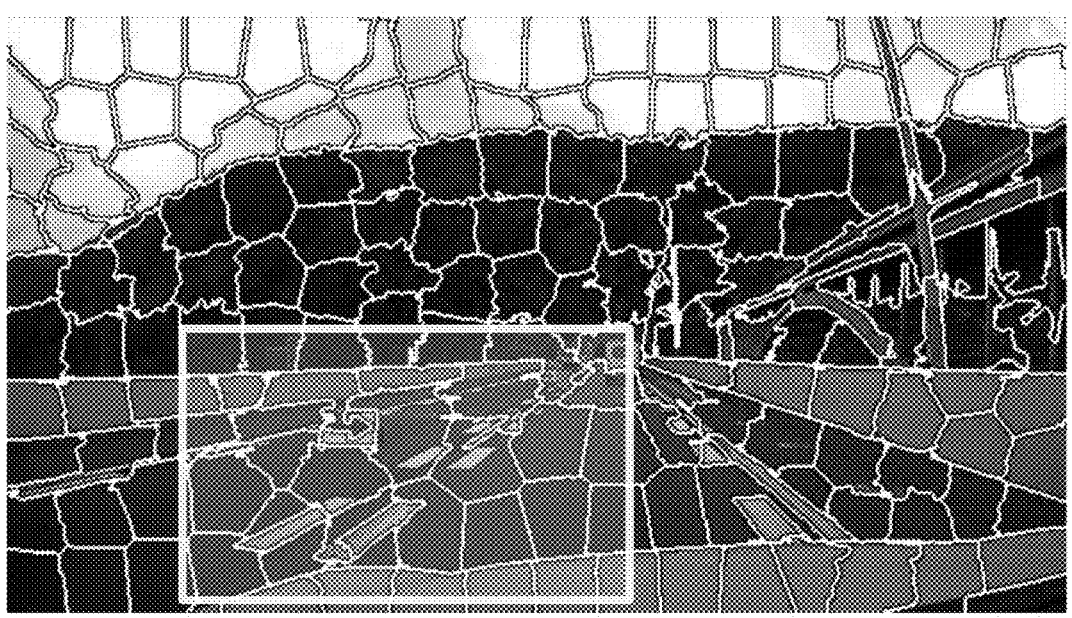
FIG. 13 is a diagram illustrating an example of an entire image divided into a plurality of super pixels.
Figure 14:
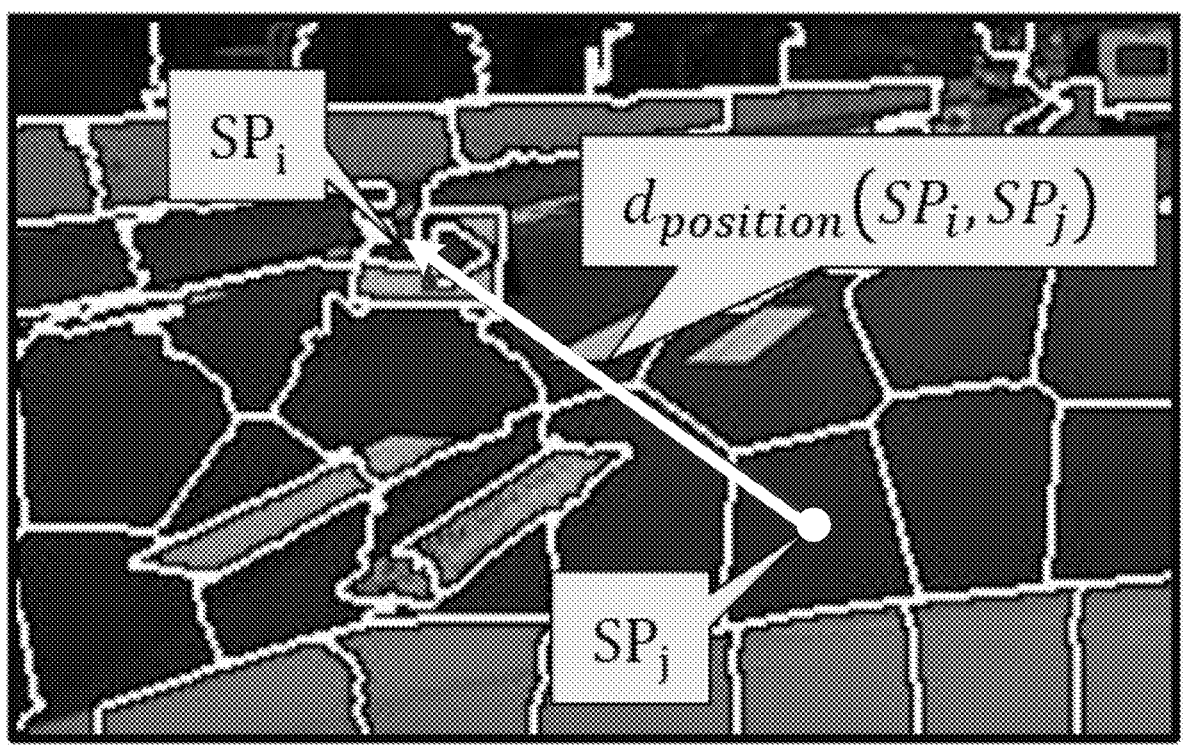
FIG. 14 is a diagram illustrating a rectangular area in an example of an entire image divided into superpixels.

First, as shown in FIGS. 13 and 14, the image is divided into a plurality of superpixels SP, which are local regions that do not straddle the boundary between the foreground and the background, and the visual saliency $S_{ij}$ with respect to the j-th SP ($SP_j$) to the i-th SP (SP) is defined by the following equation. And the total value, $L_i = \Sigma_j S_{ij}$, related to j of the visual saliency $S_j$, is defined as Likelihood $L_i$ with respect to Superpixel $Sp_i$, and the likelihood $L_i$ is calculated as the likelihood of an obstacle. FIG. 13 is a diagram illustrating an example of an entire image divided into a plurality of superpixels, and FIG. 14 is a diagram illustrating a rectangular region in an example of the entire image divided into superpixels.

$$S_{ij} = n(SP_j) \cdot P_{road}(SP_j) \cdot P_{other}(SP_i) \cdot \qquad \text{(Equation 4)}$$

$$d_{color}(SP_i, SP_j) \cdot \exp\left(-\frac{d_{position}(SP_i, SP_j)^2}{2 \cdot weight^2}\right)$$

Note that n ($SP_j$) is the number of pixels in the j-th superpixel SP, $d_{color}(SP_i, SP_j)$ is the color average distance between the i-th superpixel SP and the j-th superpixel SP, $P_{road}(SP_j)$ is the probability that the j-th superpixel SP is "road", $P_{other}(SP_i)$ is the probability that the i-th superpixel SP is "other", $d_{position}(SP_i, SP_j)$ indicates the center-of-gravity distance between the i-th superpixel SP and the j-th superpixel SP, and weight indicates the median value of the distances between all the superpixels SP.

Further, the processing performed at each unit of the road obstacle detection device 10 in each of the above embodiments has been described as software processing performed by executing a program, but is not limited thereto. For example, the processing may be a combination of both software and hardware. In the case of software processing, the program may be stored in various non-transitory storage media such as HDD, SSD, and DVD and distributed.

The flowcharts illustrated in FIGS. 5 and 6 are merely examples, and the order of the steps may be changed as appropriate, or steps may be added or deleted as appropriate.

Further, the present invention is not limited to the above, and may be variously modified and implemented in addition to the above without departing from the gist of the invention.

The present disclosure is aimed to provide a road obstacle detection device, a road obstacle detection method, and a road obstacle detection program capable of improving the detection accuracy of a road obstacle compared to the case of detecting a road obstacle from a semantic label.

The road obstacle detection device according to a first aspect includes an association unit that uses a pre-learned first identifier to associate a semantic label with each pixel of an image; a distribution estimation unit that uses a pre-learned second identifier to estimate a statistical distribution of a semantic label of a predetermined region of interest of the image from a statistical distribution of a semantic label of a peripheral region that surrounds the region of interest; and an obstacle estimation unit that uses the statistical distribution of the semantic label associated with the region of interest by the association unit and the statistical distribution of the semantic label estimated for the region of interest by the distribution estimation unit to estimate a likelihood that an object is a road obstacle.

According to the first aspect, the association unit associates a semantic label with each pixel of the image using the pre-learned first identifier.

In the distribution estimation unit, a statistical distribution of a semantic label of a predetermined region of interest of the image is estimated, using a pre-learned second identifier, from a statistical distribution of a semantic label of a peripheral region that surrounds the region of interest.

Then, in the obstacle estimation unit, a likelihood that an object is a road obstacle is estimated using the statistical distribution of the semantic label associated with the region of interest by the association unit and the statistical distribution of the semantic label estimated for the region of interest by the distribution estimation unit. This makes it possible to detect an obstacle on the road without preparing and learning various types of obstacles as learning data. Further, since it is not necessary to prepare and learn road obstacles as learning data, the association of incorrect semantic labels is suppressed, and the detection accuracy of road obstacles can be improved to higher than a case of detecting road obstacles from semantic labels.

Note that, as in a second aspect, the obstacle estimation unit may estimate the likelihood that an object is a road obstacle based on a square of a difference between the statistical distribution of the semantic label associated with the region of interest by the association unit and the statistical distribution of the semantic label estimated for the region of interest by the distribution estimation unit, an absolute value of the difference, an inner product, and a probability distribution distance. Alternatively, as in a third aspect, the obstacle estimation unit may estimate the likelihood that an object is a road obstacle based on a probability that is determined using visual saliency, which is defined by a relationship between the peripheral region and the region of interest.

Further, as in a fourth aspect, the obstacle estimation unit may divide the image into a plurality of localized regions located in only one of a foreground or a background, select the region of interest and the peripheral region from the plurality of localized regions, and thereby estimate the likelihood that an object is a road obstacle.

Further, as in a fifth aspect, a region of interest may be a rectangular region that encompasses a region likely to be an object, which is acquired by extracting a region of a solid mass from an image.

The road obstacle detection method according to a sixth aspect is a road obstacle detection method executed by a computer, in which a pre-learned first identifier is used to associate a semantic label with each pixel of an image, and a pre-learned second identifier is used to estimate a statistical distribution of a semantic label of a predetermined region of interest of the image from a statistical distribution of a semantic label of a peripheral region that surrounds the region of interest, and the statistical distribution of the semantic label associated with the region of interest and the statistical distribution of the semantic label estimated for the region of interest is used to estimate a likelihood that an object is a road obstacle.

According to the sixth aspect, similarly to the first aspect, it is possible to detect a road obstacle without preparing and learning various types of obstacles themselves as learning data. Further, since it is not necessary to learn a road obstacle, it is possible to improve the detection accuracy of a road obstacle as compared with a case of detecting road obstacles from semantic labels.

As in a seventh aspect, a computer may be a recording medium storing a road obstacle detection program for causing the computer to function as each section of a road obstacle detection device according to any of the first to fifth aspects.

As described above, according to the present disclosure, a road obstacle detection device, a road obstacle detection method, and a recording medium that stores a road obstacle detection device capable of improving the detection accuracy of a road obstacle compared with a case of detecting a road obstacle from semantic labels.

What is claimed is:

1. A road obstacle detection device, comprising:
    a memory; and
    a processor coupled to the memory,
    wherein the processor is configured to:
        use a pre-learned first identifier to associate a semantic label with each pixel of an image;
        use a pre-learned second identifier to estimate a statistical distribution of a semantic label of a region of interest of the image from a statistical distribution of a semantic label of a peripheral region that surrounds the region of interest, the region of interest being predefined; and
        use a statistical distribution of the semantic label associated with the region of interest and the statistical distribution of the semantic label estimated for the region of interest to estimate a likelihood that an object is a road obstacle, wherein
    the likelihood that the object is a road obstacle is estimated based on a square of a difference between the statistical distribution of the semantic label associated with the region of interest and the statistical distribution of the semantic label estimated for the region of interest, an absolute value of the difference, an inner product, and a probability distribution distance.

2. The road obstacle detection device according to claim 1, wherein the processor is configured to:
    divide the image into a plurality of localized regions located in only one of a foreground or a background;
    select the region of interest and the peripheral region from the plurality of localized regions; and
    estimate the likelihood that the object is a road obstacle.

3. The road obstacle detection device according to claim 1, wherein the region of interest is a rectangular region that encompasses a region likely to be an object, which is acquired by extracting a region of a solid mass from an image.

4. A road obstacle detection method, the method comprising, by a processor:
    using a pre-learned first identifier to associate a semantic label with each pixel of an image, and using a pre-learned second identifier to estimate a statistical distribution of a semantic label of a predetermined region of interest of the image from a statistical distribution of a semantic label of a peripheral region that surrounds the region of interest, wherein the region of interest is predetermined; and
    using a statistical distribution of the semantic label associated with the region of interest and the statistical distribution of the semantic label estimated for the region of interest to estimate a likelihood that an object is a road obstacle, wherein
    the likelihood that the object is a road obstacle is estimated based on a square of a difference between the statistical distribution of the semantic label associated with the region of interest and the statistical distribution of the semantic label estimated for the region of interest, an absolute value of the difference, an inner product, and a probability distribution distance.

5. The road obstacle detection method according to claim 4, the method comprising, by a processor:
    dividing the image into a plurality of localized regions located in only one of a foreground or a background;
    selecting the region of interest and the peripheral region from the plurality of localized regions; and
    estimating the likelihood that the object is a road obstacle.

6. The road obstacle detection method according to claim 4, wherein the region of interest is a rectangular region that encompasses a region likely to be an object, which is acquired by extracting a region of a solid mass from an image.

7. A non-transitory storage medium that stores a program that causes a processor to execute road obstacle detection processing, the processing including:
    using a pre-learned first identifier to associate a semantic label with each pixel of an image, and using a pre-learned second identifier to estimate a statistical distribution of a semantic label of a region of interest of the image from a statistical distribution of a semantic label of a peripheral region that surrounds the region of interest, wherein the region of interest is predetermined; and
    using a statistical distribution of the semantic label associated with the region of interest and the statistical distribution of the semantic label estimated for the region of interest to estimate a likelihood that an object is a road obstacle, wherein
    the likelihood that the object is a road obstacle is estimated based on a square of a difference between the statistical distribution of the semantic label associated with the region of interest and the statistical distribution of the semantic label estimated for the region of interest, an absolute value of the difference, an inner product, and a probability distribution distance.

8. The non-transitory storage medium according to claim 7, wherein processing further comprises:
    dividing the image into a plurality of localized regions located in only one of a foreground or a background;
    selecting the region of interest and the peripheral region from the plurality of localized regions; and
    estimating the likelihood that the object is a road obstacle.

9. The non-transitory storage medium according to claim 7, wherein the region of interest is a rectangular region that encompasses a region likely to be an object, which is acquired by extracting a region of a solid mass from an image.

* * * * *